United States Patent [19]

Nishimura et al.

[11] Patent Number: 5,059,886

[45] Date of Patent: Oct. 22, 1991

[54] CHARGING GENERATOR

[75] Inventors: Shinji Nishimura; Kazutoshi Kaneyuki, both of Hyogo, Japan

[73] Assignee: Mitsubishi Denki Kabushiki Kaisha, Tokyo, Japan

[21] Appl. No.: 532,730

[22] Filed: Jun. 4, 1990

[30] Foreign Application Priority Data

Jun. 5, 1989 [JP] Japan .................... 1-142442

[51] Int. Cl.$^5$ .............................................. H02J 7/14
[52] U.S. Cl. ...................................... 322/28; 322/21; 320/64
[58] Field of Search ...................... 322/28, 21; 320/64

[56] References Cited

U.S. PATENT DOCUMENTS

| | | | |
|---|---|---|---|
| 3,278,831 | 10/1966 | Gatlin et al. | 322/28 |
| 3,868,558 | 2/1975 | Winkley et al. | 322/28 |
| 4,940,928 | 7/1990 | Nishimura | 322/28 |

FOREIGN PATENT DOCUMENTS

| | | | |
|---|---|---|---|
| 0649578 | 10/1962 | Canada | 322/28 |
| 1341959 | 12/1973 | United Kingdom | 322/28 |

Primary Examiner—Steven L. Stephan
Assistant Examiner—Thomas M. Dougherty
Attorney, Agent, or Firm—Sughrue, Mion, Zinn, Macpeak and Seas

[57] ABSTRACT

A charging generator charges a battery by a voltage output from a generating unit having an armature coil and a field coil. The generator comprises a voltage boost/drop circuit connected between the output of the generator unit and the battery; a first control circuit connected between the field coil of the generating unit and the battery for controlling a field current flowing through the field coil to regulate a voltage generated in the armature coil of the generating unit in response to a voltage across the battery; and a second control circuit connected to the voltage boost/drop circuit for controlling the boost/drop ratio of the voltage boost/drop circuit.

1 Claim, 11 Drawing Sheets

CHARGING GENERATOR

BACKGROUND OF THE INVENTION

This invention relates generally to a charging generator and, more particularly, to a charging generator which is used in a wide range of rotational speed of a generating unit.

Charging generators of this kind or, more specifically, charging generators generally used for motor vehicles have a circuit such as that shown in FIG. 1. That is, a generating unit 1 has an armature coil 101 and a field coil 102. A three-phase full-wave rectifier 2 constituted by six diodes are provided to rectify the alternating voltage output from the generating unit 1. A plus terminal of a battery 4 is connected to a plus output terminal of the three-phase full-wave rectifier 2 through a diode 902. One end of the field coil 102 is connected to the plus terminal of the battery 4. The other end of the field coil 102 is connected to the collector of a transistor 301 and is also connected to the plus terminal of the battery 4 through a diode 302. An output terminal of a voltage regulator 3 is connected to the base of the transistor 301. The voltage regulator 3 controls the field current flowing through the field coil 102 and, hence, the output from the generating unit 1. The output terminal of the three-phase full-wave rectifier 2 is also connected to the collector of another transistor 901. A control circuit 903 for controlling the short-circuit current of the generating unit 1 by switching the transistor 901 is connected to the base of the transistor 901.

In this charging generator, a field current supplied from the battery 4 flows through the field coil 102 and the transistor 301 while the generating unit 1 is being driven by an engine (not shown), and an alternating voltage is thereby induced across the armature coil 101. This voltage is rectified by the three-phase full-wave rectifier 2 and is applied to the battery 4 to charge the same. If at this time the terminal voltage of the battery 4 is higher than a predetermined level, the voltage regulator 3 switches off the transistor 301 to reduce the field current and, hence, the voltage induced in the generating unit 1. When the terminal voltage becomes lower than the predetermined level, the voltage regulator 3 switches on the transistor 301 to increase the field current and, hence, the induced voltage. The terminal voltage of the battery 4 is controlled in this manner to be maintained at the predetermined level. If the rotational speed of the engine is so low that the induced voltage cannot be increased to the level high enough to charge the battery 4 even if the field current is maximized, the control circuit 903 switches on the transistor 901 connected to the output terminal of the three-phase full-wave rectifier 2 to make the short-circuit current flow through the generating unit 1, and then switches off the transistor 901. When the transistor 901 is thereby switched off after being switched on, the current flowing through the armature coil 101 does not immediately become zero by the effect of the inductance of the armature coil 101, and a charging current therefore flows to the battery 4 through the diode 902.

In the thus-constructed conventional charging generator, the generating unit has only an output current proportional to the armature reaction, and a problem of difficulty in obtaining a sufficient output is therefore encountered. That is, during high speed rotation of the generating unit, the output from the generating unit is not increased or is reduced when the transistor 901 is switched to obtain the desired output.

SUMMARY OF THE INVENTION

In view of this problem it is an object of the present invention to provide a charging generator which is capable of extracting a possible maximum output from the generating unit in a range of rotational speed of the same from a low speed to a high speed while constantly maintaining the charging voltage, and which is capable of increasing the power generation efficiency.

Another object of the present invention is to provide a charging generator in which a voltage boost/drop circuit is connected to the output terminal of the generating unit and the battery is connected to an output terminal of the voltage boost/drop circuit, and in which the boost/drop ratio of the voltage boost/drop circuit is changed and controlled to constantly maintain the output voltage irrespective of the generated voltage.

According to the present invention, the boost/drop ratio of the voltage boost/drop circuit can be freely selected with respect to the operating state of the generating unit, so that when the generated voltage is lower than the battery voltage, the voltage obtained by boosting the generated voltage is output to charge the battery or, when the generated voltage is higher than the battery voltage, the generated voltage is reduced to output a constant voltage. At the same time, the power generation efficiency is improved by reducing the armature current of the generating unit.

According to the present invention, the boost/drop circuit is connected to the generating unit and is arranged to control the boost/drop ratio as well as the field current. It is thereby possible to increase the output current as well as to improve the power generation efficiency based on controlling the generated voltage as desired while constantly maintaining the charging voltage in a wide range of rotational speed from a low speed to a high speed.

DESCRIPTION OF THE PREFERRED EMBODIMENTS

Figure 1:
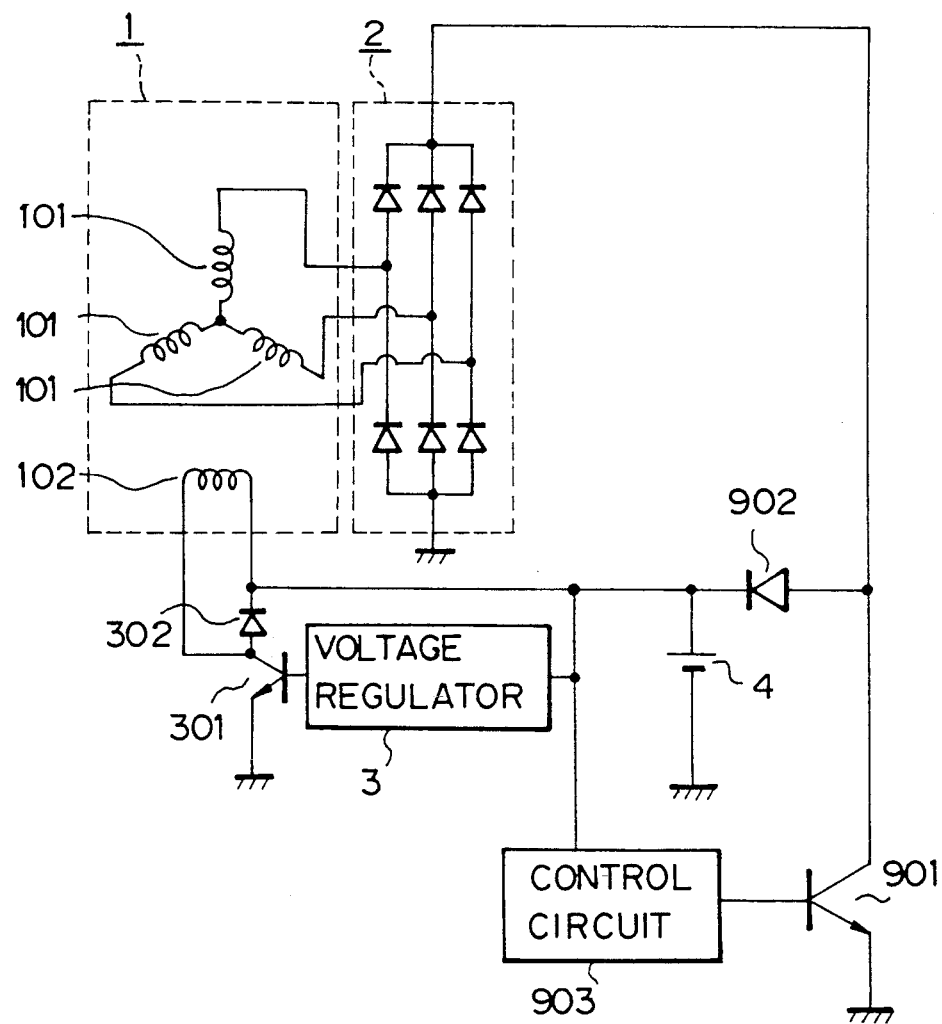
FIG. 1 is a circuit diagram of a conventional charging generator.
Figure 2:
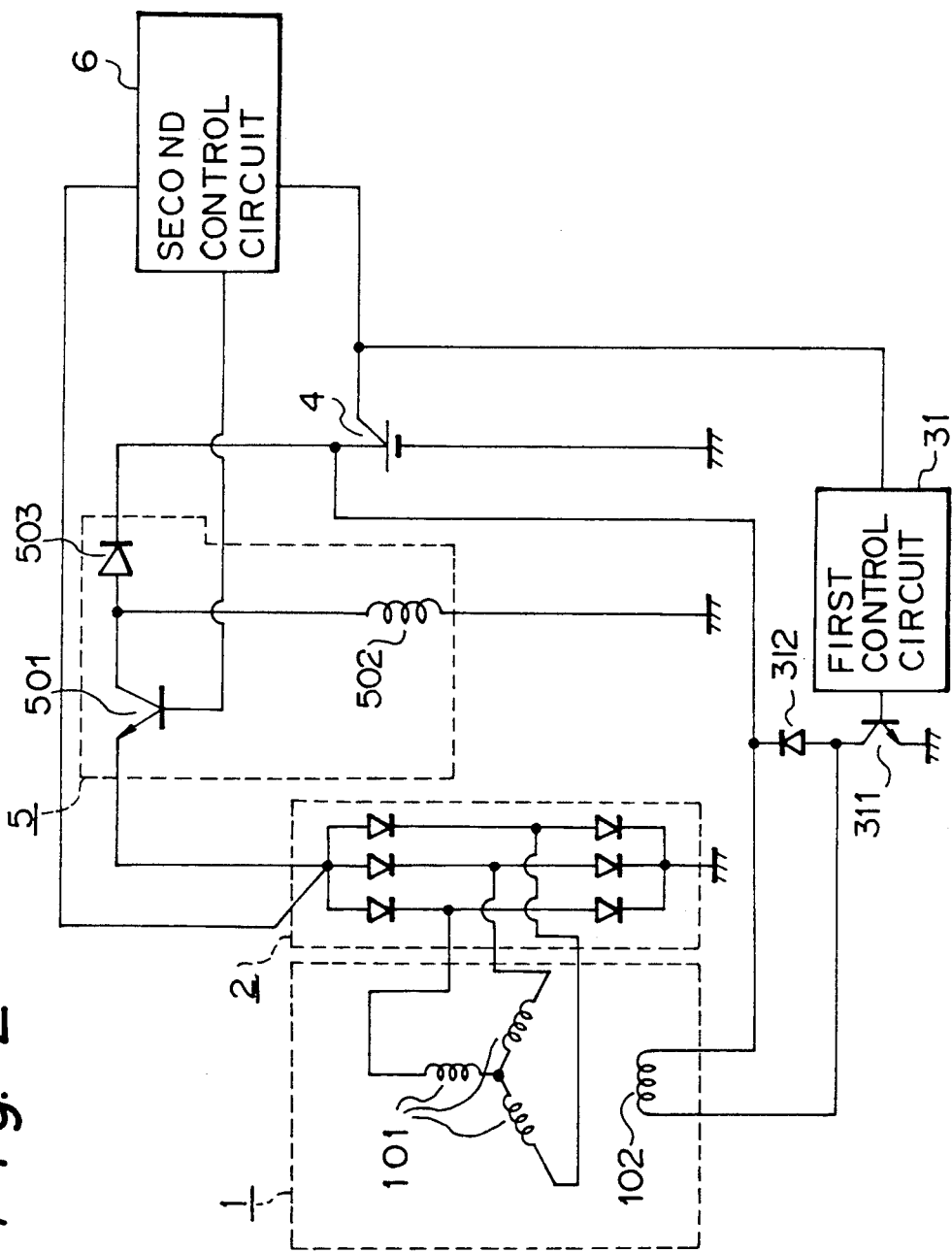
FIG. 2 is a circuit diagram of a charging generator which represents an embodiment of the present invention.

Referring to FIG. 2, a circuit of a charging generator which represents an embodiment of the present invention is illustrated. In this embodiment, a generating unit 1 has an armature coil 101 and a field coil 102. A three-phase full-wave rectifier 2 constituted by six diodes is provided to rectify the alternating voltage output from the generating unit 1. An output terminal of the three-phase full-wave rectifier 2 is connected to a battery 4 through a voltage boost/drop circuit 5 for increasing or reducing the voltage of the output from the generating unit 1. One end of the field coil 102 is connected to the plus terminal of the battery 4. The other end of the field coil 102 is connected to the collector of a transistor 311 and is also connected to the plus terminal of the battery 4 through a diode 312. An output terminal of a first control circuit 31 for controlling the field current flowing through the field coil 102 is connected to the base of the transistor 311.

The voltage boost/drop circuit 5 is constituted by an npn transistor 501, a reactor 502 and a diode 503. The emitter of the npn transistor 501 is connected to the minus output terminal of the three-phase full-wave rectifier 2. The collector of the npn transistor 501 is connected to the plus output terminal of the three-phase full-wave rectifier 2 through the reactor 502 and to the plus terminal of the battery 4 through the diode 503. The minus terminal of the battery is connected to the plus output terminal of the three-phase full-wave rectifier 2. A polarity inverting chopper circuit is thereby formed. The base of the npn transistor 501 is connected to a second control circuit 6 which detects the voltage of the battery 4 and the voltage of the output from the generating unit 1 and controls switching of the transistor 501.

The operation of this embodiment will be described below.

In the above-described circuit, a field current supplied from the battery 4 flows through the field coil 102 and the transistor 311 while the generating unit 1 is being driven by an engine (not shown). An alternating voltage is thereby induced across the armature coil 101 and is rectified by the three-phase full-wave rectifier 2. If at this time the transistor 501 of the voltage boost/drop circuit 5 is switched on, a current flows from the plus terminal of the three-phase full-wave rectifier 2 to the minus terminal of the same via the reactor 502 and the transistor 501. When the transistor 501 is thereafter switched off, the battery 4 is charged through the diode since the current flowing through the reactor 502 does not immediately become zero.

If the dc voltage obtained by rectifying the voltage of the output from the generating unit 1 is $V_1$, the terminal voltage of the battery 4 is $V_2$, the transistor 501 switching-on time is $T_1$, and the transistor 501 switching-off time is $T_2$, $V_2 = V_1 (T_1/T_2)$ is established, as is well known (as described on p 172 of Denki Gakkai Daigaku Koza Kiso Denkikiki-gaku, 1986, Denki Gakkai (The institute of Electrical Engineers of Japan). That is, the boost/drop ratio $V_2/V_1$ can be freely selected by changing the ratio of $T_1$ and $T_2$. Consequently, it is possible to maintain the battery 4 charging voltage at a predetermined level while freely selecting the voltage of the output from the generating unit 1.

Figure 3:
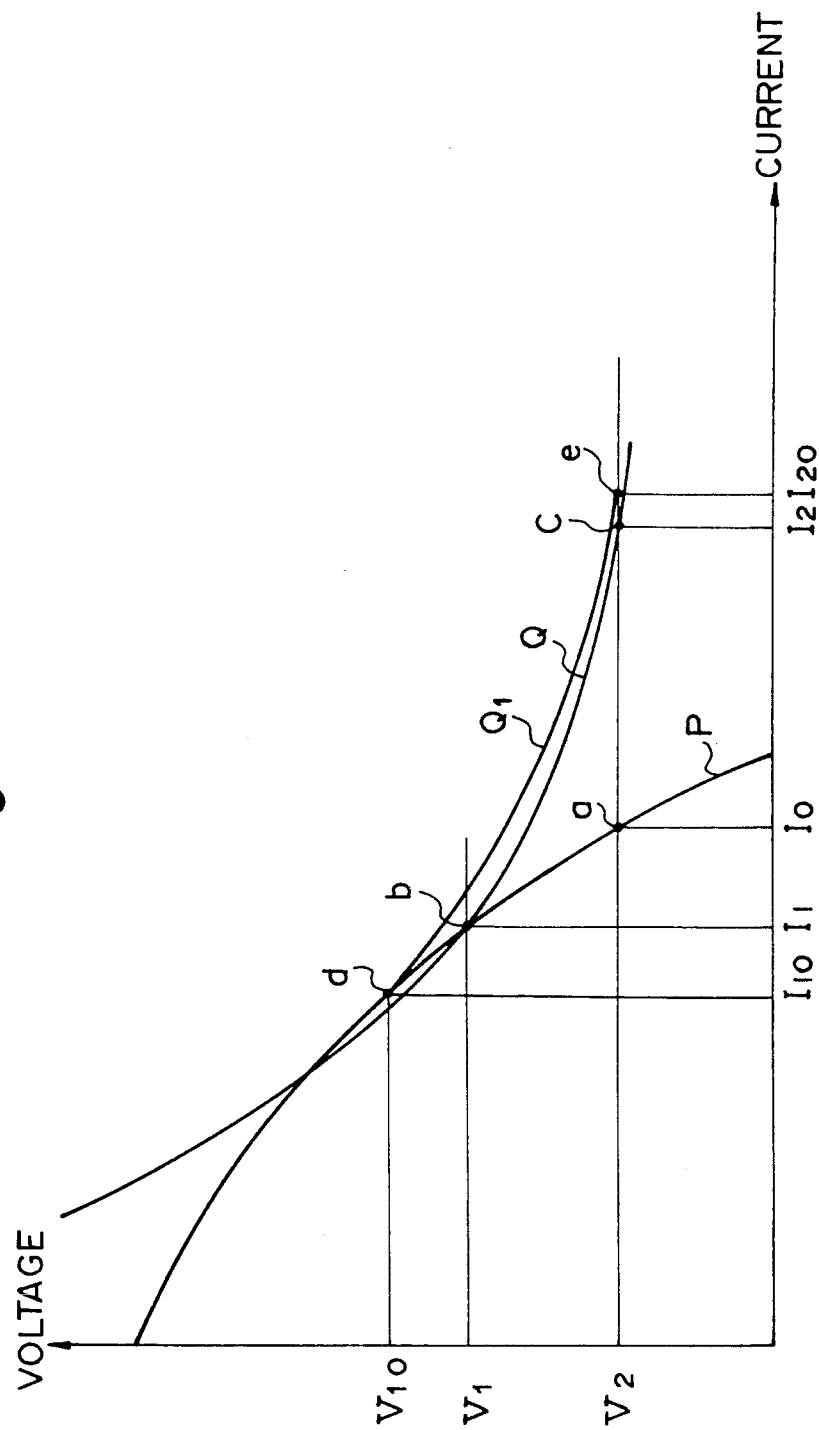
FIGS. 3 and 4 are graphs of external load characteristic curves representing the operating characteristics of the charging generator shown in FIG. 2.

FIG. 3 shows examples of external load characteristic curves, the ordinate representing voltage, the abscissa representing current. A curve P represents a possible voltage-current characteristic of the generating unit 1 under the condition that the rotational speed of the generating unit 1 and the field current are constant (the field current is maximum). A point a represents a state of the conventional generator in which a maximum output current is obtained and in which the voltage of the output from the generating unit 1 is $V_2$ while the output current is $I_0$. On the other hand, in this embodiment, the voltage of the output from the generating unit can be selected as desired. If the voltage of the output from the generating unit 1 is $V_1$, the output is as represented by a point b, and the current of the output from the generating unit is $I_1$. If at this time the boost/drop ratio of the voltage boost/drop circuit 5 is selected to reduce the output voltage to $V_2$, the output current $I_2$ from the voltage boost/drop circuit 5 is $I_2 = I_1 \times (V_1/V_2)$, and the output state of the charging generator is as represented by a point c on a curve Q. That is, as is apparent from FIG. 3, the output can be remarkably increased. While the output is increased, the current flowing through the generating unit 1 is as multiplied by a ratio of $(I_1/I_0)$ as in the case of the conventional generator, and the copper loss represented by $I^2R$ is multiplied by $(I_1/I_0)^2$ and is thus reduced in comparison with the conventional arrangement. A point d shown in FIG. 3 indicates the maximum of current $\times$ voltage on the curve P. In this state, the voltage of the output from the generating unit 1 is represented by $V_{10}$, and the output current is represented by $I_{10}$. If in this state the voltage of the output from the voltage boost/drop circuit 5 is reduced to $V_2$ while selecting the boost/drop ratio so that the generated voltage becomes $V_{10}$, the output state of the charging generator is as represented by a point e on a curve $Q_1$, and the output current is $I_{20}$ which is a maximum value. The curves Q and $Q_1$ are hyperbolas each representing voltage $\times$ current = constant.

Figure 4:
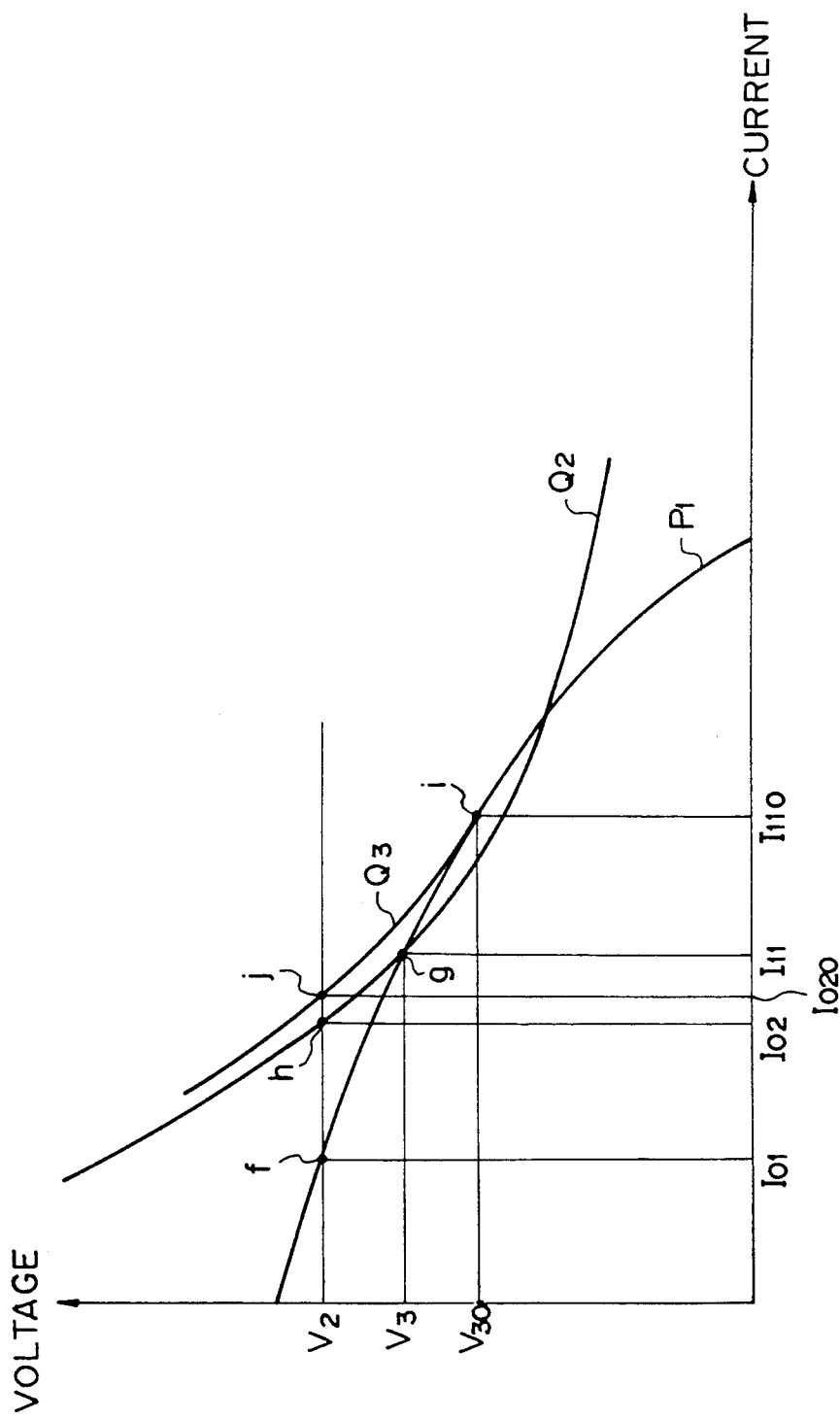

FIG. 4 shows other examples of external load characteristic curves in a case where the rotational speed is comparatively low. A curve $P_1$ represents a possible voltage-current characteristic of the generating unit 1. Since the voltage of the output from the generating unit 1 can also be selected as desired, if the voltage of the output from the generating unit 1 is $V_3$, the output is as represented by a point g, and the current of the output from the generating unit is $I_{11}$. If the boost/drop ratio of the voltage boost/drop circuit 5 is selected to increase the output voltage to $V_2$, the output current $I_{02}$ from the voltage boost/drop circuit 5 is $I_{02} = I_{11} \times (V_3/V_2)$, and the output state of the charging generator is as represented by a point h on a curve $Q_2$. That is, as is apparent from FIG. 4, the output can be remarkably increased. At a point i, current $\times$ voltage on the curve P is maximum. In this state, the voltage of the output from the generating unit 1 is represented by $V_{30}$, and the output current is represented by $I_{110}$. If in this state the voltage of the output from the voltage boost/drop circuit 5 is increased to $V_2$ while selecting the boost/drop ratio so that the generated voltage becomes $V_{30}$, the output state of the charging generator is as represented by a point j on a curve $Q_3$, and the output current is $I_{020}$ which is a maximum value. The curves $Q_2$ and $Q_3$ are hyperbolas each representing voltage $\times$ current = constant.

Figure 5:
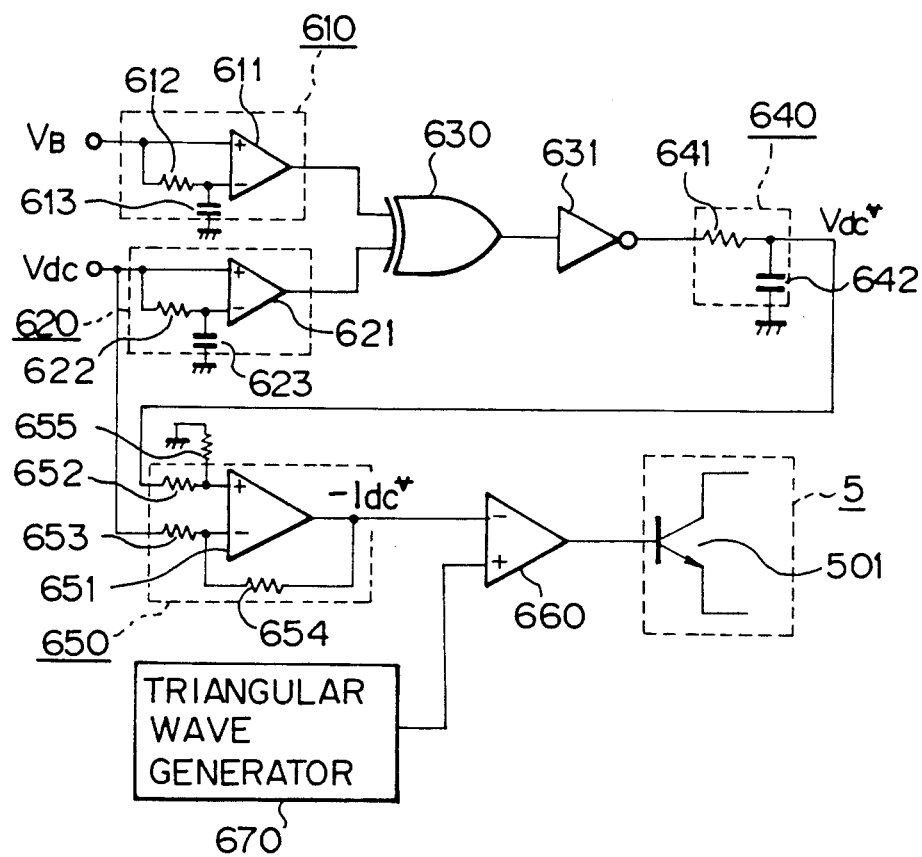
FIG. 5 is a diagram of a control circuit of the charging generator shown in FIG. 2.

FIG. 5 shows the construction of the second control circuit 6 shown in FIG. 2. The control circuit 6 has a first differentiator 610 constituted by a voltage comparator 611, a resistor 612 and a capacitor 613; a second differentiator 620 constituted by a voltage comparator 621; a resistor 622 and a capacitor 623; an exclusive logical OR calculating element (EX-OR) 630 supplied with outputs from the two differentiators 610 and 620; an inverter 631 for inverting the output from the EX-OR 630; and an integrator 640 constituted by a resistor 641 connected to an output terminal of the inverter 631, and capacitor 642. The control circuit 6 also has an error amplifier 650 constituted by an operational amplifier 651, resistors 652, 653, 654 and 655, having its input terminal connected to the output terminal of the integrator 640 and its other input terminal connected to an input terminal of the second differentiator 620; and a voltage comparator 660 having its inverting input terminal connected to an output terminal of the error amplifier 650 and its non-inverting terminal connected a triangular wave generator 670.

Figure 6:
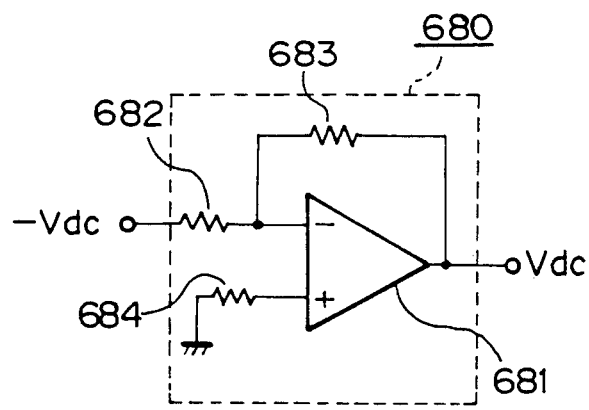
FIG. 6 is a diagram of a voltage inverting circuit of the charging generator shown in FIG. 2.

An output terminal of the voltage comparator 660 is connected to the base of the transistor 501 of the voltage boost/drop circuit 5. An input terminal of the first differentiator 610 is connected to the plus terminal of the battery 4. The input terminal of the second differentiator 620 is connected to the minus output terminal of the three-phase full-wave rectifier 2 through a voltage inverting circuit 680 such as that shown in FIG. 6. The voltage inverting circuit 680 is constituted by an operational amplifier 681 and resistors 682, 683 and 684 and serves to invert a negative voltage $-V_{dc}$ to a positive voltage $V_{dc}$.

The second control circuit 6 is thus constructed. As the voltage input into the first differentiator 610 is increased, the increased voltage is directly applied to a non-inverting input terminal of the voltage comparator 611, while a lower input voltage delayed by the resistor and the capacitor 613 is applied to an inverting terminal of the voltage comparator 611. The output from the voltage comparator 611 therefore becomes high level. Conversely, as the voltage input into the first differentiator 610 drops, the voltage is applied to the inverting input terminal after being also delayed, and this inverting input terminal voltage therefore becomes higher than the non-inverting input terminal voltage. The output from the voltage comparator 611 thereby becomes low level. The second differentiator 620 also has the same construction and operates in the same manner. That is, each of the differentiators 610 and 620 performs a differentiation operation such that the output becomes high level when the input voltage rises, or becomes low level when the input voltage drops. The outputs from the differentiators 610 and 620 are input into the EX-OR 630. The EX-OR 630 outputs a low level signal when the two inputs are equal to each other, or outputs a high level signal when the two inputs differ from each other. The combination of the EX-OR 630 and the inverter 631 constitutes an exclusive logical NOR (EX-NOR) circuit, and the output from this circuit is input into the integrator 640. Output $V_{dc}$* from the integrator 640 rises gradually when the output from the inverter 631 is high level, or drops gradually when the output from the inverter 631 is low level.

That is, the output $V_{dc}$* from the integrator 640 rises when both the terminal voltage $V_B$ of the battery 4 and the voltage $V_{dc}$ of the output from the three-phase full-wave rectifier 2 inverted to a positive voltage after passing through the voltage inverter circuit 680 rise or drop, or the output $V_{dc}$* drops when one of $V_B$ and $V_{dc}$ rises while the other drops.

The error amplifier 650 is supplied with $V_{dc}$ which is input into the second differentiator 620, and is also supplied with the output $V_{dc}$* from the integrator 640. The error amplifier 659 amplifies the difference between these input voltages. The voltage comparator 660 compares the voltage $-I_{dc}$* output from the error amplifier 650 and the voltage of the output from the triangular wave generator 670. The output from the voltage comparator 660 becomes high level to switch on the transistor 501 of the voltage boost/drop circuit 5 if the voltage of the output from the triangular wave generator 670 is higher than $-I_{dc}$*, or becomes low level to switch off the transistor 501 if the voltage of the output from the triangular wave generator 670 is lower than $-I_{dc}$*.

Figure 7:
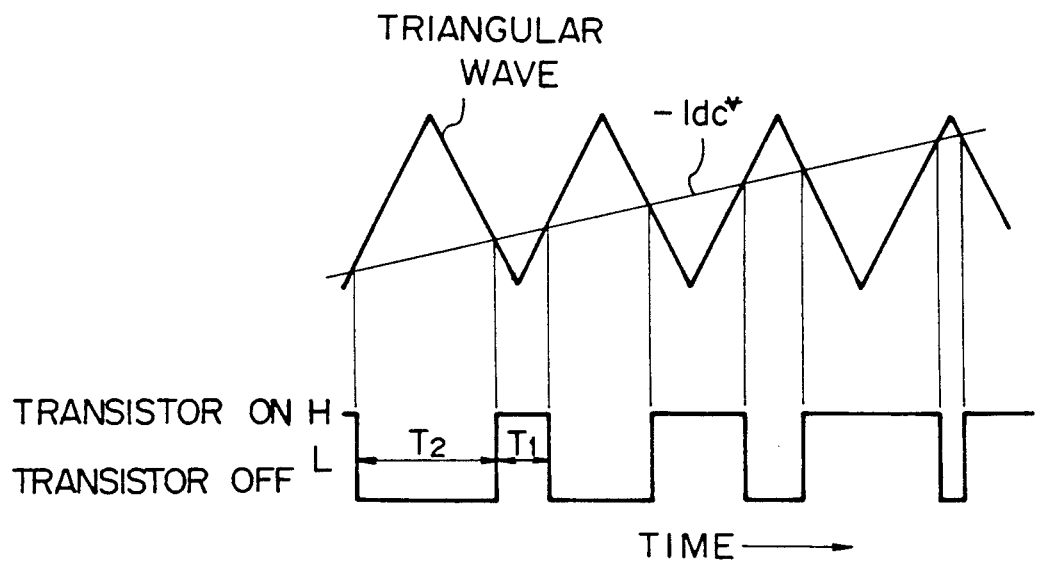
FIG. 7 is a diagram of an operating characteristic of a voltage comparator of the circuit shown in FIG. 5.

FIG. 7 shows an operating characteristic of the voltage comparator 660. As is apparent from FIG. 7, as $-I_{dc}$* rises, the transistor 501 switching-on time $T_1$ is reduced while the switching-off time $T_2$ is increased. The ratio of these periods of time $T_1/T_2$, i.e., the boost/drop ratio $V_2/V_1$ is thereby reduced. As a result, the current output from the generating unit 1 and flowing through the transistor 501 is reduced.

Although the voltage taken from the minus terminal of the three-phase full-wave rectifier 2 as the generating unit 1 output voltage is negative, the same voltage is supplied through the voltage inverter 680 to be input into the second differentiator 622 of the second control circuit 6. That is, the voltage input into the second differentiator 622 can be regarded as the positive voltage $V_{dc}$. If the value of $V_{dc}$* is $V_1$ shown in FIG. 3 and if the value of $V_{dc}$ is lower than $V_1$ (or equal to, e.g., $V_2$), $-I_{dc}$* output from the error amplifier 650 is increased since the inverting input is lower than the non-inverting input, so that the transistor 501 switching-on time is shortened and the generated current is reduced. Since the voltage-current characteristic of the generating unit 1 is represented by the curve P shown in FIG. 3, the state of power generation is changed as represented by a movement along the curve P from the point a toward the point b. If the limit indicated by the point b is exceeded, the generated voltage $V_{dc}$ exceeds $V_1$ and the inverting input into the error amplifier 650 becomes lower, thereby reducing $-I_{dc}$*. The transistor 501 switching-off time is thereby extended and the generated current is increased; the state of power generation is changed again as represented by a movement toward the point b. Thus, the boost/drop circuit 5 is controlled by the operation of the error amplifier 650 so that the generated voltage $V_{dc}$ and the voltage $V_{dc}$* are equalized.

The voltage $V_{dc}$* output from the integrator 640 is regarded as a value for designating the voltage $V_{dc}$ generated by the generating unit 1. The selection of $V_{dc}$* will be explained below with reference to external load characteristic curves shown in FIG. 8.

Figure 8:
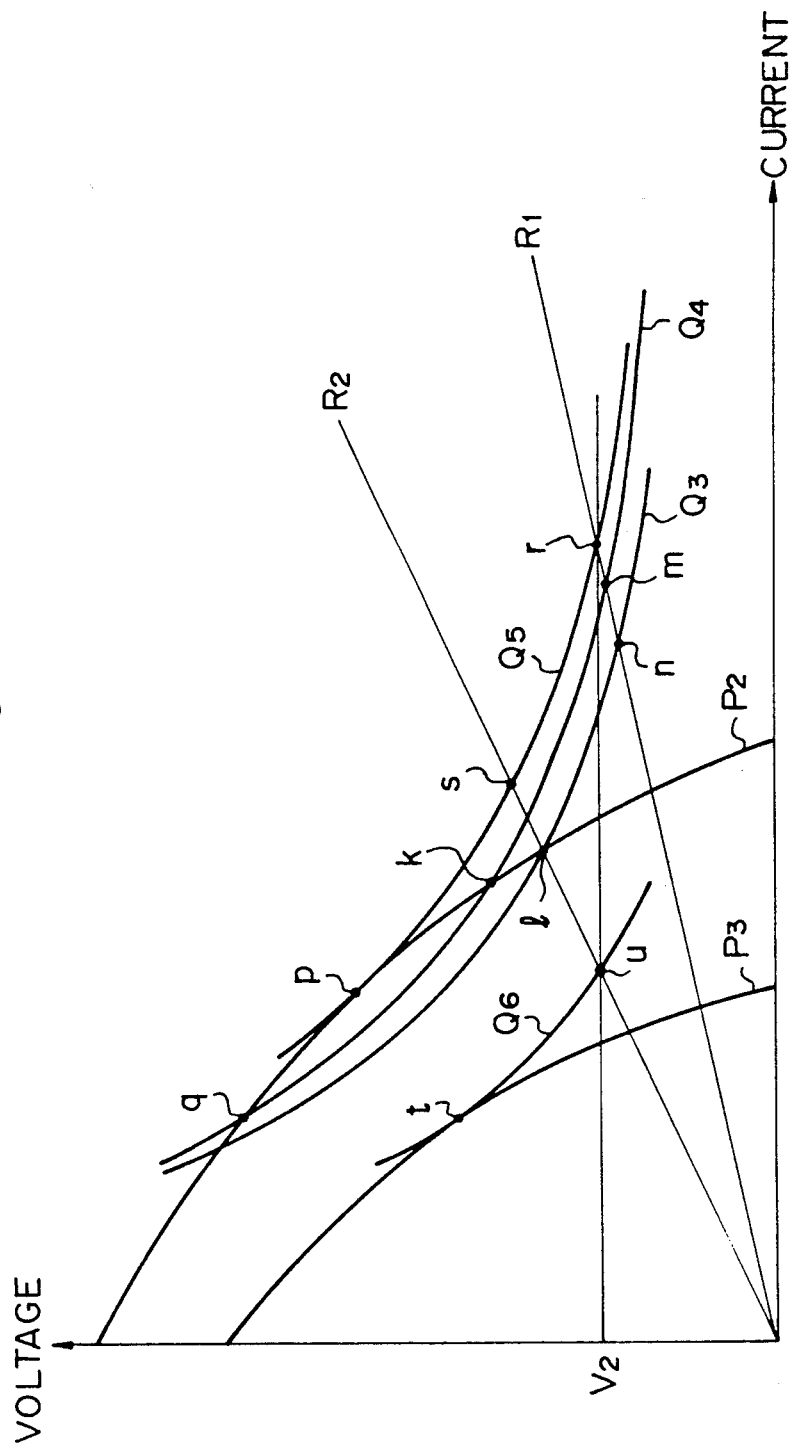
FIG. 8 is a graph of external load characteristic curves representing the control characteristics of the circuit shown in FIG. 5.

In FIG. 8, a curve $P_2$ represents a possible voltage-current characteristic of the generating unit 1, and each of curves $Q_3$, $Q_4$ and $Q_5$ represents voltage×current = constant value. It is assumed here that an electrical load having a characteristic represented by a straight line $R_1$ is connected to the battery 4 in parallel, and that $V_{dc}$* is such that the state of power generation is as represented by a point k. If the output from the inverter 631 is low level, the charge in the capacitor 642 of the integrator 640 is discharged through the resistor 641, so that $V_{dc}$* drops gradually. The voltage $V_{dc}$ generated by the generating unit 1 is controlled so as to be equal to $V_{dc}$*, and is reduced to, for example, the level indicated by a point 1. Correspondingly, the output state of the voltage boost/drop circuit 5 is changed as represented by a movement from the point of intersection m of the curve $Q_4$ and the straight line $R_1$ to the point of intersection n of the curve $Q_3$ and the straight line $R_1$. Since at this time both the generated voltage $V_{dc}$ and the battery voltage $V_B$ drop, the output from the EX-OR 630 becomes low level and the output from the inverter 631 becomes high level, so that the capacitor 642 is charged through the resistor 641, thereby gradually increasing $V_{dc}*$. If the state of power generation is returned to the point k again, $V_{dc}*$ further rises, since $V_B$ and $V_{dc}$ are rising. When the state of power generation is changed to a state represented by a point q after passing the state represented by a point p, the output state of the boost/drop circuit 5 is as represented by the point m, while the output state of the boost/drop circuit 5 when the point p is reached is as represented by the point of intersection r of the curve $Q_5$ and the straight line $R_1$. When the point q is reached, $V_{dc}$ rises and $V_B$ drops, so that the output from the EX-OR 630 becomes high level while the output from the inverter 631 becomes low level, thereby gradually reducing $V_{dc}*$. Thus, the state of power generation as represented by the point p, i.e., the voltage at which the output from the generating unit 1 is maximized can be found.

If the electrical load has a characteristic represented by $R_2$, the output state of the boost/drop circuit 5 is as represented by a point s when the state of power generation represented by the point p is established. At this time, however, since the voltage of the battery 4 is higher than the predetermined level $(V_2)$, the first control circuit operates to reduce the field current, thereby setting a possible current-voltage characteristic of the generating unit 1 as represented by a curve $P_3$. Then a point t on the curve $P_3$ at which the output is maximized is found by the second control circuit 6 in the same manner as above. The corresponding output state of the boost/drop circuit 5 is as represented by the point of intersection u of a curve $Q_6$ representing voltage×current=constant value and the straight line $R_2$. The terminal voltage of the battery 4 is maintained at the predetermined level $(V_2)$.

Figure 9:
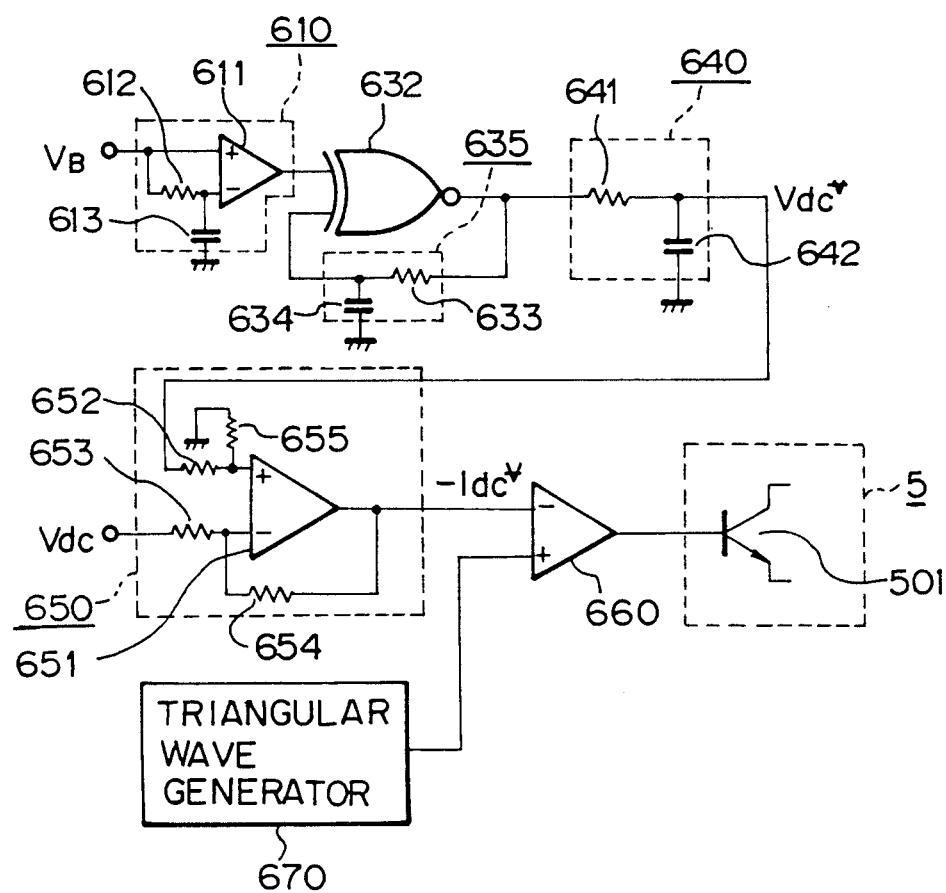
FIG. 9 is a diagram of a second control circuit in accordance with another embodiment of the present invention.

In the above-described embodiment, the change in $V_{dc}*$ is determined based on an exclusive logical NOR operation performed by the second control circuit 6 using the change in the battery voltage and the change in the generated voltage. Alternatively, the logic of the determination of $V_{dc}*$ may be as shown in FIG. 9. That is, the change in the battery voltage $V_B$ is input into an exclusive logical NOR calculating element (EX-NOR) 632 as one of two inputs through a differentiator 610. The output from the EX-NOR 632 is input into the EX-NOR 632 as the other input through a delay circuit 635 constituted by a resistor 633 and a capacitor 634. The output from the EX-NOR 632 is input into the integrator 640 which outputs $V_{dc}*$. In accordance with this embodiment, when the output from the differentiator 610 is high level, that is, $V_B$ rises, the other input to the EX-NOR 632 is high level if the output from the EX-NOR 632 is high level, or the other input is low level if the output from the EX-NOR 632 is low level. In either case, the output can be obtained with desired stability, and $V_{dc}*$ is increased or reduced through the integrator 640. When the output from the differentiator 610 is low level, that is, $V_B$ drops, the circuit operates as described below. If the output from the EX-NOR 632 becomes high level to make $V_{dc}*$ rise, the output from the EX-NOR 632 changes to low level since the other input to the EX-NOR 632 is high level, thereby reducing $V_{dc}*$. When $V_B$ starts rising, the output from the EX-NOR 632 becomes stably low level to further reduce $V_{dc}*$ and to increase $V_B$. If the output from the EX-NOR 632 becomes low level to reduce $V_{dc}*$ when $V_B$ is dropping, the output from the EX-NOR 632 changes to high level since the other input to the EX-NOR 632 is low level, thereby increasing $V_{dc}*$. When $V_B$ starts rising, the output from the EX-NOR 632 becomes stably high level to further increase $V_{dc}*$ and to increase $V_B$. Thus, the state of power generation for obtaining the maximum output from the generating unit 1 can be found.

Figure 10:
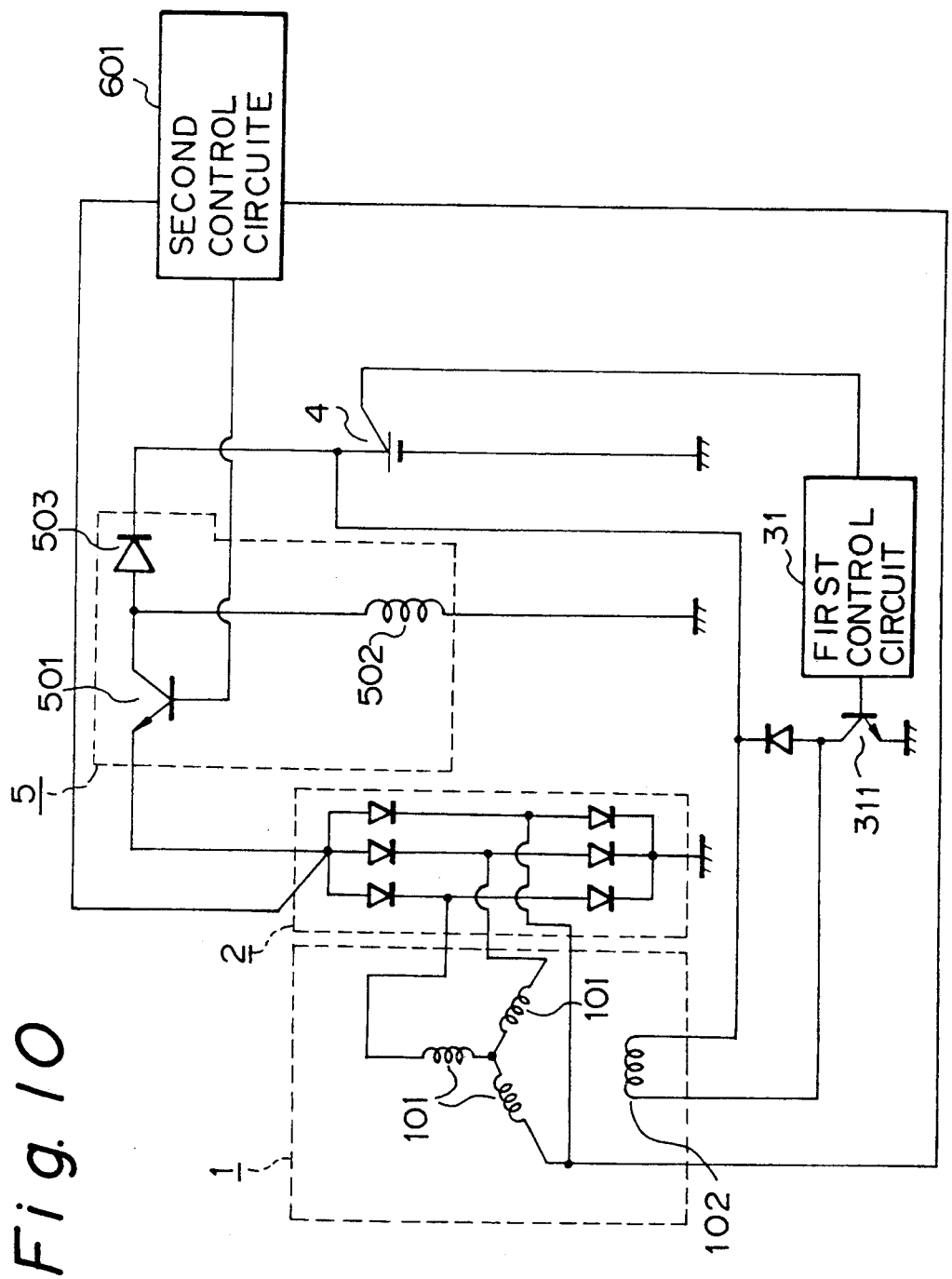
FIG. 10 is a circuit diagram of still another embodiment of the present invention.
Figure 11:
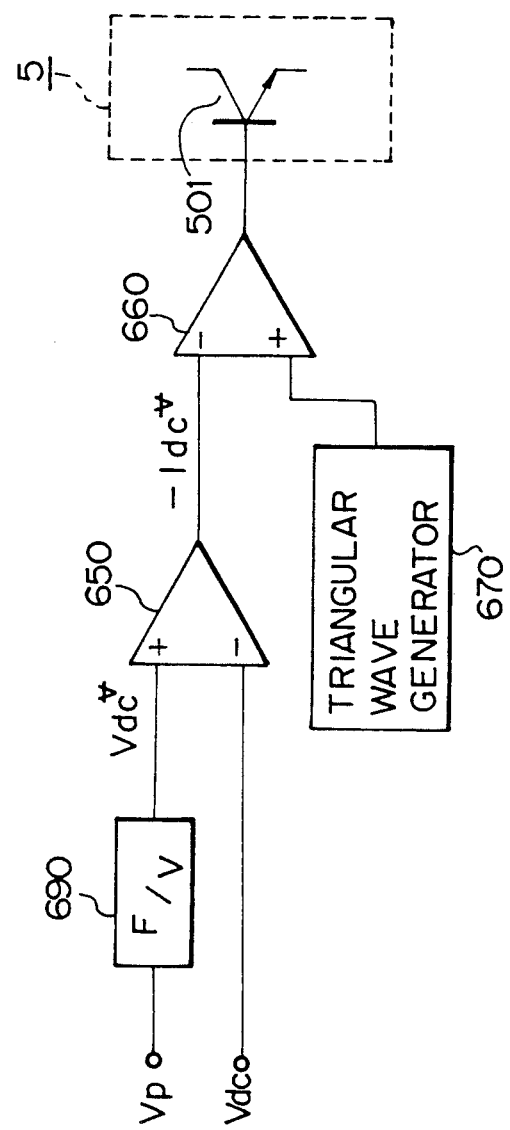
FIG. 11 is a diagram of a second control circuit of the embodiment shown in FIG. 10.

A still another embodiment of the present invention will be described below with reference to FIGS. 10 and 11. FIG. 10 shows a circuit corresponding to the overall construction of this embodiment, and FIG. 11 shows the construction of a second control circuit 601. In this embodiment, the generated voltage $V_{dc}$ corresponding to the rotational speed of the generating unit 1 is obtained by making $V_{dc}*$ from the voltage $V_p$ of the armature coil 101 through an F/V (frequency-voltage) converter 690. The F/V converter 690 may have a characteristic such that, for example, the generating unit 1 generates a voltage corresponding to a maximum output from the generating unit 1 with respect to the rotational speed of the generating unit 1 exhibited when the field current is maximum.

Figure 12:
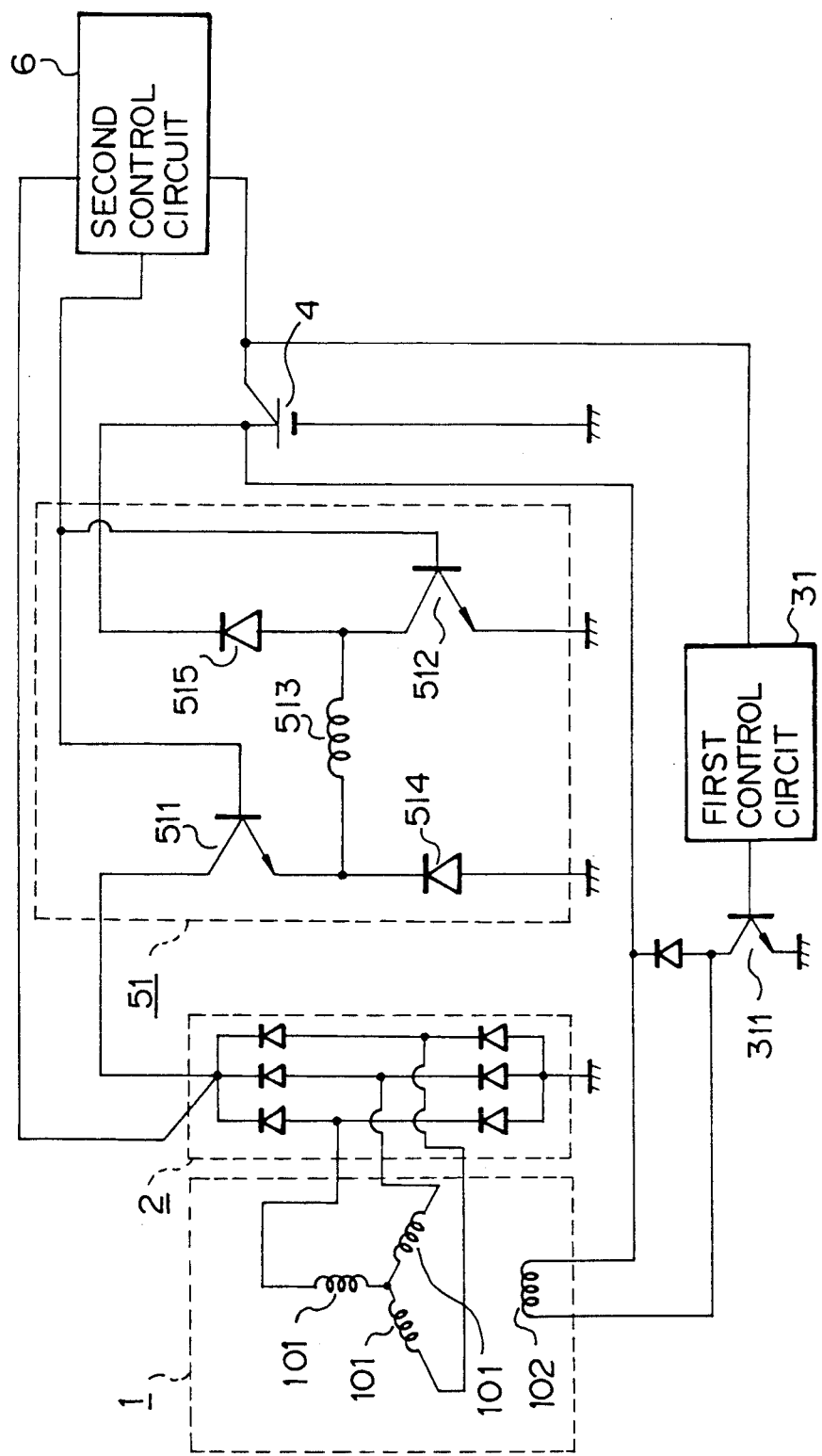
FIG. 12 is a circuit diagram of a further embodiment of the present invention.

In the above-described embodiments, a polarity inverting chopper is used as the voltage boost/drop circuit. Alternatively, a voltage boost/drop circuit 51 constructed as shown in FIG. 12 may be used. The voltage boost/drop circuit 51 of this embodiment operates as described below. When transistors 511 and 512 are simultaneously switched on, the generated current flows through the transistor 511, a reactor 513 and the transistor 512. When the transistors 511 and 512 are switched off, the current flowing through the reactor 513 does not immediately become zero. This current flows through a diode 514, the reactor 513 and a diode 515 to charge the battery 4. In the illustrated circuit, the transistors 511 and 512 are simultaneously switched. Alternatively, these transistors may constitute a voltage reducing circuit such that the transistor 511 is switched on and off while the other transistor 512 is always switched off, or a booster circuit such that the transistor 512 is switched on and off while the transistor 511 is always switched on, thereby achieving a similar operation. In this embodiment, the three-phase full-wave rectifier 2 may have the same polarity as the conventional generator, since the voltage polarity of the voltage boost/drop circuit is not inverted.

What is claimed is:

1. A charging generator for charging a battery by a voltage output from a generating unit having an armature coil and a field coil comprising:

voltage boost/drop circuit means connected between the output of said generating unit and said battery;

first control circuit means connected between the field coil of said generating unit and said battery for controlling a field current flowing through the field coil to regulate a voltage generated in the armature coil of said generating unit in response to a voltage across said battery; and second control circuit means connected to said voltage boost/drop circuit means for controlling the boost/drop ratio of said voltage boost/drop circuit means.

* * * * *